US008537866B2

(12) United States Patent
Lin

(10) Patent No.: US 8,537,866 B2
(45) Date of Patent: Sep. 17, 2013

(54) GENERATING LASER PULSES OF NARROW SPECTRAL LINEWIDTH BASED ON CHIRPING AND STRETCHING OF LASER PULSES AND SUBSEQUENT POWER AMPLIFICATION

(75) Inventor: Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 0 days.

(21) Appl. No.: 13/112,979

(22) Filed: May 20, 2011

(65) Prior Publication Data
US 2012/0294323 A1 Nov. 22, 2012

(51) Int. Cl.
*H01S 3/10* (2006.01)

(52) U.S. Cl.
USPC .......................................... 372/25

(58) Field of Classification Search
USPC ................... 398/118; 359/337.2; 372/18, 25
See application file for complete search history.

(56) References Cited

U.S. PATENT DOCUMENTS

| 5,499,134 | A | 3/1996 | Galvanauskas et al. |
| 5,696,782 | A | 12/1997 | Harter et al. |
| 5,847,863 | A | 12/1998 | Galvanauskas et al. |
| 7,113,327 | B2 | 9/2006 | Gu et al. |
| 8,228,597 | B2 | 7/2012 | Fermann et al. |
| 2003/0112494 | A1 | 6/2003 | Barty et al. |
| 2005/0041702 | A1 | 2/2005 | Fermann et al. |
| 2011/0211598 | A1* | 9/2011 | Liu et al. ........................ 372/6 |
| 2012/0062984 | A1* | 3/2012 | Tong et al. ................ 359/337.2 |

FOREIGN PATENT DOCUMENTS

WO WO-2005094275 A2 10/2005

OTHER PUBLICATIONS

Banks, P.S., et al., "Novel All-Reflective Stretcher for Chirped-Pulse Amplification of Ultrashort Pulses," *IEEE Journal of Quantum Electronics*, vol. 36(3):268-274, Mar. 2000.
Zhou, Yue, et al., "All-Fiber-Based Ultrashort Pulse Generation and Chirped Pulse Amplification Through Parametric Processes," *IEEE Photonics Technology Letters*, vol. 22(17):1330-1332, Sep. 1, 2010.

* cited by examiner

*Primary Examiner* — Jessica Stultz
*Assistant Examiner* — Tuan Nguyen
(74) *Attorney, Agent, or Firm* — Perkins Coie LLP

(57) ABSTRACT

Techniques and devices for producing short laser pulses based on chirping and stretching of short seed laser pulses and subsequent power amplification. Such laser pulses with relatively narrow spectral bandwidths can be used in certain laser applications where narrow spectral bandwidth laser pulses are advantageous. In the examples described in this document, the generated laser pulses with relatively narrow spectral bandwidths may have relatively long pulse durations (e.g., greater than 1 ps) due to the stretching operation in the pulse generation.

23 Claims, 18 Drawing Sheets

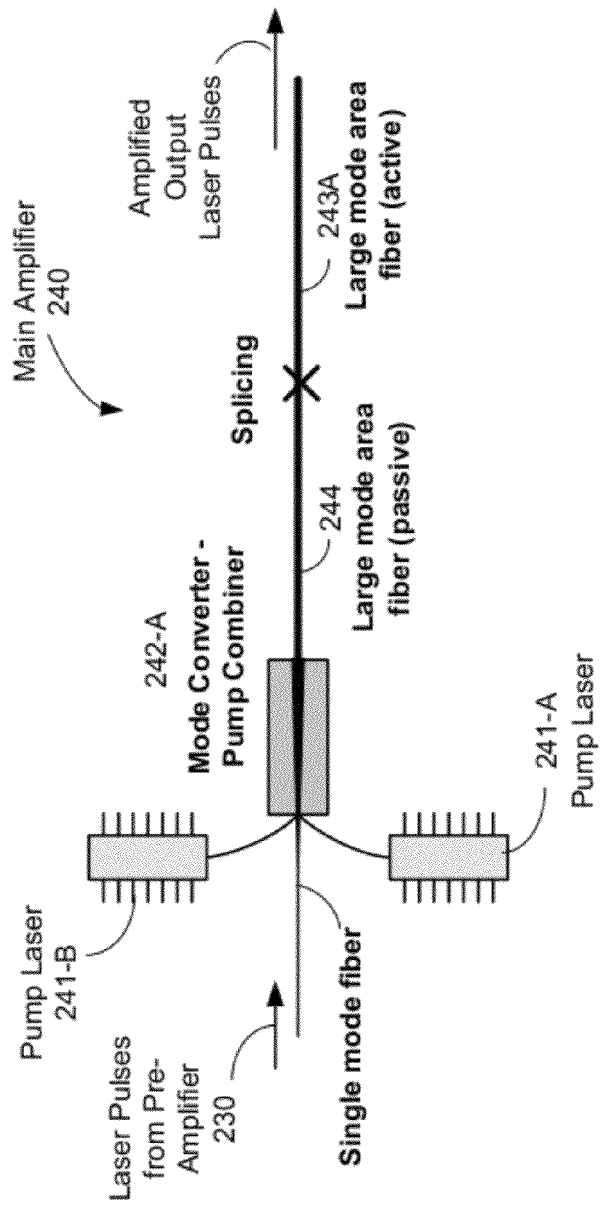
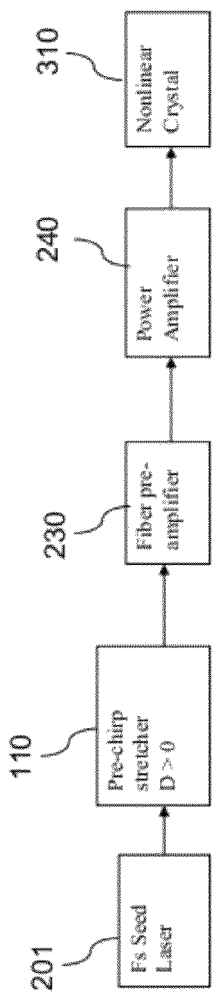

No-chirp 6 picosecond pulse input to fiber amplifier.

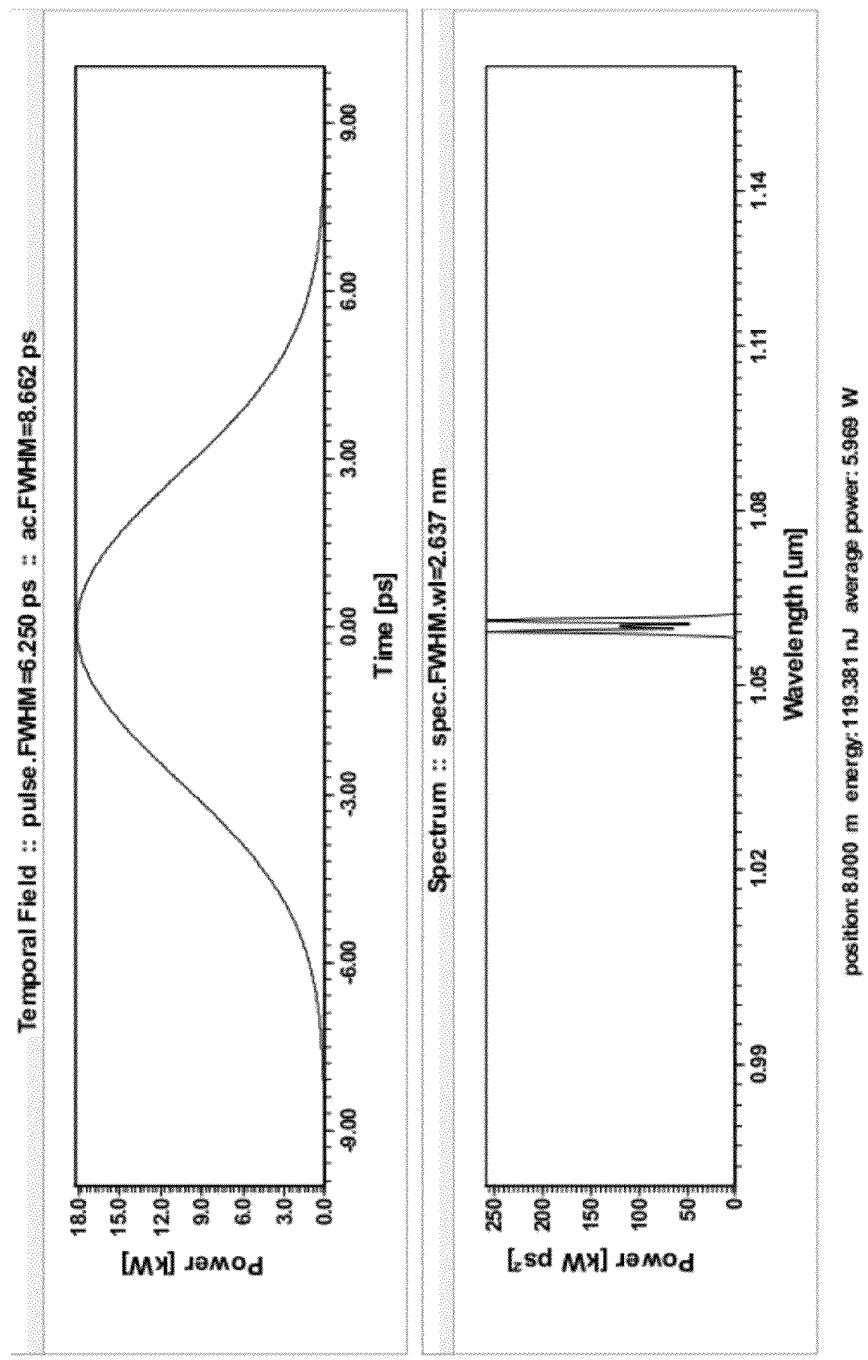

Generation of narrow linewidth (<0.31 nm) output pulse ~10 ps with output power of 22.5W or 451 nJ with 20 um MFD LMA power fiber amplifier.

GENERATING LASER PULSES OF NARROW SPECTRAL LINEWIDTH BASED ON CHIRPING AND STRETCHING OF LASER PULSES AND SUBSEQUENT POWER AMPLIFICATION

BACKGROUND

This document relates to generation of laser pulses by using optical pulse amplifiers and pulse lasers.

Pulsed lasers of different technical properties have a wide range of uses and some examples are optical communications, optical imaging, laser material processing, laser surgery and biomedical applications, spectroscopic measurements and optical sensing applications, and laser displays. For some applications, ultra short pulsed (USP) lasers with a pulse length less than 1 picosecond, such as femtosecond pulse lasers, are attractive and examples of such applications include certain material processing, optical sensing, optical ablation, precision surgery including ophthalmology, biomedical, nonlinear studies and spectroscopy. Associated with the ultra short pulse durations in such ultra short pulsed (USP) lasers is that a laser pulse contains spectral components over a relatively wide spectral bandwidth.

In certain applications, it is desirable to use light with narrow spectral bandwidths and thus the relatively wide spectral bandwidths of short laser pulses of USP lasers may not be beneficial.

SUMMARY

This document describes techniques and devices for generating laser pulses with relatively narrow spectral bandwidths (e.g., less than 1 nm) based on chirping and stretching of short seed laser pulses and subsequent power amplification. Such laser pulses with relatively narrow spectral bandwidths can be used in certain laser applications where narrow spectral bandwidth laser pulses are advantageous. In the examples described in this document, the generated laser pulses with relatively narrow spectral bandwidths may have relatively long pulse durations (e.g., greater than 1 ps) due to the stretching operation in the pulse generation.

In one aspect, a method for generating laser pulses can be implemented to include generating seed laser pulses having a seed pulse duration; modifying the seed laser pulses to produce modified laser pulses that have a pulse duration greater than the seed pulse duration and have a positive chirp in optical frequency; and directing the modified laser pulses into an optical amplifier formed of an optical gain medium exhibiting normal optical dispersion to the modified laser pulses to amplify the modified optical pulses with the positive chirp to a power level that causes self-phase modulation to compress a spectral width of the amplified modified optical pulses to be less than a spectral width of the seed laser pulses while having a pulse duration longer than the seed pulse duration.

In another aspect, a device for generating laser pulses can be implemented to include a seed pulsed laser to generate seed laser pulses having a seed pulse duration; an optical stretcher that receives the seed laser pulses and configured to modify the seed laser pulses to produce modified laser pulses that have a pulse duration greater than the seed pulse duration and have a positive chirp in optical frequency; and an optical amplifier formed of an optical gain medium exhibiting normal optical dispersion to the modified laser pulses. The optical amplifier is coupled to receive the modified laser pulses from the optical stretcher and configured to amplify the modified optical pulses with the positive chirp to a power level that causes self-phase modulation to compress a spectral width of the amplified modified optical pulses to be less than a spectral width of the seed laser pulses while having a pulse duration longer than the seed pulse duration.

In yet another aspect, a fiber-based device for generating laser pulses can be implemented to include a seed pulsed fiber laser to generate seed laser pulses having a seed pulse duration, and an optical fiber stretcher coupled to the seed pulsed fiber laser to receive the seed laser pulses and configured to include a chirped fiber Bragg grating exhibiting anomalous optical dispersion. The optical fiber stretcher is operable to modify the seed laser pulses to produce modified laser pulses that have a pulse duration greater than the seed pulse duration and have a positive chirp in optical frequency. This device includes an optical fiber amplifier exhibiting normal optical dispersion to the modified laser pulses and coupled to receive the modified laser pulses from the optical fiber stretcher. The optical fiber amplifier is configured to amplify the modified optical pulses with the positive chirp to a power level that causes self-phase modulation to compress a spectral width of the amplified modified optical pulses to be less than a spectral width of the seed laser pulses while having a pulse duration longer than the seed pulse duration.

These and other aspects, their implementations and other features are described in detail in the drawings, the description and the claims.

BRIEF DESCRIPTION OF THE DRAWINGS

FIG. 2A shows an example of a double clad large mode-area (LMA) fiber amplifier for implementing the main power amplifier 240 in FIG. 2.

FIGS. 3-12 show various aspects of the designs in FIGS. 1 and 2.

DETAILED DESCRIPTION

Figure 1:
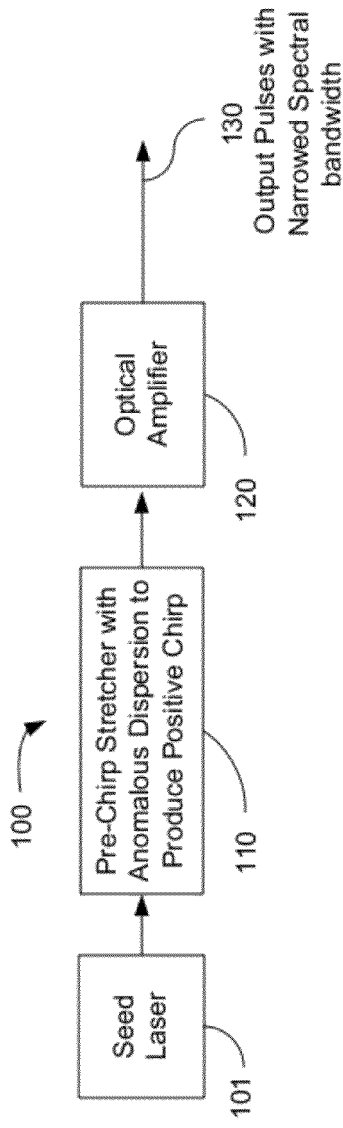
FIG. 1 shows one example of a pulsed laser device based on pulse stretching and pulse chirp prior to power amplification.

The spread of spectral components over a relatively wide spectral bandwidth in USP lasers may be undesirable in certain laser applications where narrow spectral bandwidth laser pulses are advantageous. Examples of such applications are devices and systems based on various nonlinear optical effects which degrade in efficiency with the increase of the spectral bandwidth of the laser light, e.g., Raman spectroscopy, green and UV light generation based on nonlinear harmonic generation. For generation of nonlinear harmonics, the narrow spectral width is helpful for increasing the conversion efficiency and improving output beam quality due to the optical phase matching conditions in the nonlinear wave mixing associated with the generation of nonlinear harmonics.

The present techniques and devices for generation laser pulses with relatively narrow spectra bandwidths can be used to facilitate these and other applications that require light of narrow spectral bandwidths. The optical amplification mechanism built in the described techniques and devices can provide high power levels in the generated laser pulses with narrow spectral bandwidths. Such high optical power enables efficient nonlinear optical effects such as nonlinear optical wavelength conversion in various spectral ranges. As a specific example, high power pulsed lasers are currently available in certain spectral regions such as the near infrared regions. YAG, Yb, or Nd pulsed lasers near 1 um and Ti:sapphire pulsed lasers near 0.7-1.1 um are examples of such high power pulsed lasers. These lasers can be used as the pump laser to generated laser pulses in the UV or deep UV spectral regions via nonlinear optical wavelength conversion. Applications for short-wavelength pulsed lasers in the UV or deep UV spectral regions with high optical power include, for example, various laser ablation processes in material processing and surgical uses. The described techniques and devices for generating laser pulses with narrow spectral bandwidths can be used to provide efficient nonlinear wavelength conversion from laser pulses near infrared to UV.

Lasers and optical amplifiers for generating laser pulses are generally designed to avoid or reduce certain nonlinear optical effects such as self-phase modulation (SPM) caused by the nonlinear Kerr effect in optical media. The level of SPM in an optical pulse can accumulate as the pulse propagates and lead to generation of new spectral components and nonlinear chirp, making it difficult to obtain short pulses and maintaining near transform-limited spectral width. One aspect of the techniques and devices for generating laser pulses in this document is to properly control frequency chirping and to stretch the temporal duration of a seed laser pulse before optical amplification and, in the optical amplification stage, advantageously utilize SPM to reduce the spectral spread of the different spectral components in the amplified laser pulse. Notably, the frequency chirping in seed laser pulses prior to optical amplification is positive where the optical frequency increases with time in each laser pulse. This positive chirp and pulse stretching can be achieved by using an optical stretcher with anomalous optical dispersion (D>0).

FIG. 1 shows one example of a device 100 for generating narrow spectral bandwidth laser pulses 130. This device 100 includes a seed pulsed laser 101 that generates seed laser pulses having a seed pulse duration. Downstream from the seed laser 101 is an optical stretcher 110 that receives the seed laser pulses and is configured to modify the seed laser pulses to produce modified laser pulses that have a pulse duration greater than the seed pulse duration and have a positive chirp in optical frequency. The optical stretcher 110 can be implemented in various configurations, such as a grating pair stretcher with anomalous optical dispersion, a chirped mirror or prism based dispersive setup with anomalous optical dispersion, and a volume Bragg grating or other dispersion element with anomalous optical dispersion.

Next, an optical amplifier 120 is coupled to receive the modified laser pulses from the optical stretcher 110. The optical amplifier 120 is formed of an optical gain medium exhibiting normal optical dispersion (D<0) to the modified laser pulses. The optical amplifier 120 is configured to amplify the modified optical pulses with the positive chirp to a power level that causes nonlinear self-phase modulation (SPM) to compress a spectral width of the amplified modified optical pulses to be less than a spectral width of the seed laser pulses while having a pulse duration longer than the seed pulse duration. The output pulses 130 of the amplifier 120 can be further processed, e.g., undergoing additional power amplification or spectral compression.

Figure 2:
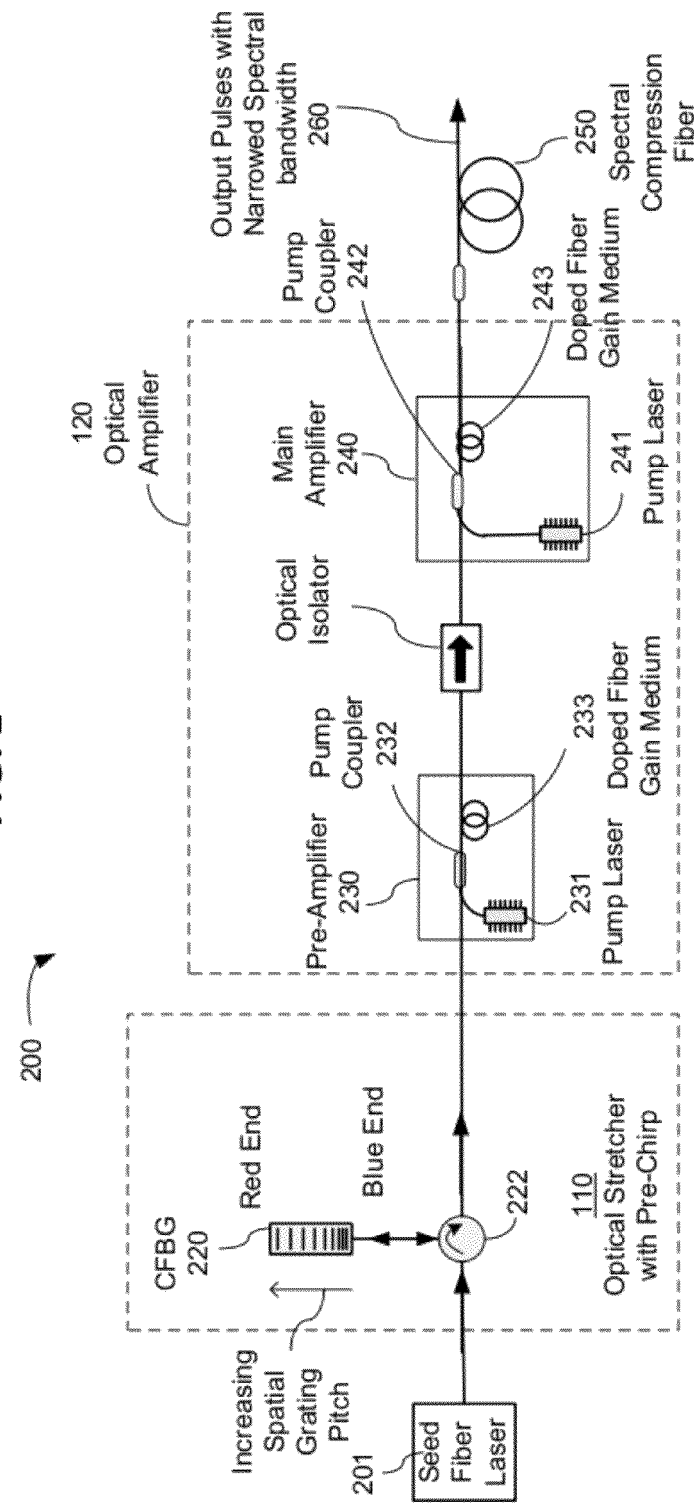
FIG. 2 shows an example implementation of the device in FIG. 1.

The device 100 in FIG. 1 can be implemented in various configurations. FIG. 2 shows a fiber device 200 based on the design in FIG. 1 for generating laser pulses. Such a fiber device with an all fiber construction can be configured to provide various advantages in certain applications, such as light device weight, good operation reliability and easy integration with other fiber devices.

In FIG. 2, a seed fiber laser 201 is implemented to generate seed laser pulses. For example, the seed fiber laser 201 can be a femtosecond mode-locked fiber laser with an output of 0.6 mW, 25 MHz, 2.7 nm bandwidth linear chirped and output pulse duration around 1 ps. A femtosecond mode-locked laser can be a fiber laser based on chirped pulse amplification (CPA) where the optical pulses are first stretched in the time domain under normal optical dispersion with a negative frequency chirp to reduce the pulse peak power, the stretched optical pulses are then amplified in an optical amplifier with normal optical dispersion to produce a stable output and, finally, the amplified optical pulses are compressed in time to produce desired short optical pulses.

In some implementations, the fiber laser 201 may be designed to have a polarization maintain output by using polarization maintaining (PM) fiber where the output polarization of the laser pulses can be stabilized at a desired polarization. In other applications, non PM fiber laser can be used in the output of the fiber laser 201.

The optical stretcher with pre-chirp 110 can be implemented by a chirped fiber Bragg grating (CFBG) 220. The CFBG 220 has a spatially chirped grating pitch that increases from one end of the fiber ("blue end") where blue light is reflected and the other end of the fiber ("red end") where red light is reflected. An optical circulator 222 is coupled to the input fiber that guides the laser pulses from the laser 201 and an output fiber that connects to the downstream optical amplifier 120. The optical circulator 222 directs light in the input fiber from the fiber laser 201 into the CFBG 220 and directs reflected light from the CFBG 220 to the output fiber to the optical amplifier 120. Notably, the CFBG 220 is oriented to have its blue end coupled to the optical circulator 22 so that spectral components with short wavelengths within the pulse spectral bandwidth are reflected first to have shorter time delays while spectral components with long wavelengths within the pulse spectral bandwidth are reflected later to have longer time delays. This arrangement effectuates an anomalous optical dispersion in the reflected light produced by the CFBG 220 and thus produces a positive chirp in optical frequency of the reflected optical pulses towards the circulator 222. As a specific example, the CFBG 220 may be a chirped fiber Bragg grating with dispersion of 6.63 ps/nm (or −3760000 fs^2) at the optical wavelength of 1064 nm to broaden the pulse to 18 ps. The circulator 222 is advantageous due to its low insertion loss. In other implementations, the optical circulator 222 can be replaced by a fiber coupler.

In operation, the CFBG 220 receives the seed laser pulses from the fiber laser 201 and reflects the light back by imposing a frequency chirp and different delays for different spectral components. This operation modifies the seed laser pulses to produce modified laser pulses that have a pulse duration greater than the seed pulse duration and have a positive chirp in optical frequency.

In the fiber device 200, the optical amplifier 110 is an all fiber based amplifier exhibiting normal optical dispersion to the modified laser pulses. The optical amplifier 110 can include one or more fiber amplifiers depending on the requirements of the optical amplification for the device 200. FIG. 2 shows an example of two fiber amplifiers: a first fiber amplifier 230 as the pre-amplifier and a second fiber amplifier 240 as the main power amplifier. Each fiber amplifier includes a pump laser (231 or 241) that produces the desired pump light, a pump coupler (232 or 242) that couples the pump light into the main fiber line where the doped fiber gain medium (233 or 243) is coupled to provide the optical gain for power amplification under optical pumping by the received pump light. The optical amplifier 110 is configured to boost the pulse peak power high enough so SPM in the amplifier 110 is strong enough to induce spectral compression that reduces the spectral width of the pulse. The self-phase modulation and associated spectral compression in the amplifier do not significantly affect the pulse duration which remains longer than the seed pulse duration.

One example of a suitable fiber amplifier for FIG. 2 is a core pump fiber amplifier such as a 4 meter long Yb doped fiber Yb500 from Coractive pumped by a 400 mW 976 nm diode laser. The 976 nm pump light and 1064 nm signal light are combined in a PM WDM. The input and output of power are usually equipped with one or two isolators. Another example of a suitable fiber amplifier for FIG. 2 is a double clad fiber amplifier pumped by a multimode pump laser at 976 nm or 915 nm.

FIG. 2A shows an example of a double clad large mode-area (LMA) fiber amplifier for implementing the main power amplifier 240 in FIG. 2. Such a large mode-area fiber amplifier can produce higher output power with lower nonlinear effects than some fiber amplifiers and thus can be advantageous for practical implementing the design in FIG. 2. The double clad configuration allows use of two lower brightness pump diodes 241-A and 241B for desired optical pumping at reduced cost. In the example in FIG. 2A, a single mode fiber is provided at the input of the LMA fiber amplifier to receive laser pulses from the pre-amplifier 230. A mode converter-pump combiner 242-A is provided to combine the pump light from the two pump diodes 241-A and 241-B and the input laser pulses into a large mode area fiber 244 which is not doped with gain ions and is a passive optical fiber. A large mode area fiber 243A is coupled to the passive LMA fiber 244 and is doped with gain ions to produce the desired optical gain for optical amplification under the optical pump from the combined pump light. The amplified output laser pulses are exported by the doped LMA fiber 243A as the output of the amplifier 240.

At the output of the amplifier 110, an optional optical spectral compression device 250 may be implemented to further compress the spectral width of the output laser pulses for certain applications. Various spectral compression techniques may be used, including, for example, a spectra compression fiber with normal optical dispersion (D<0) and SPM with an appropriate length tailored to compress the spectrum. The spectral compression fiber may be a polarization maintaining fiber (e.g., PM980 by Corning) so that output polarization is stable.

FIG. 3 shows that a device based on the device designs in FIGS. 1 and 2 for nonlinear wavelength conversion in a nonlinear optical material 310 such as a nonlinear optical crystal for generating harmonic signals from the narrow spectral bandwidth laser pulses. Nonlinear optical effects require certain phase matching conditions to achieve nonlinear conversion efficiency. The narrow spectral bandwidth laser pulses generated based on the present techniques for chirping control and spectral compression can be suitable for efficient nonlinear wavelength conversion and wave mixing. In nonlinear harmonic generation, due to dispersion in nonlinear crystal, the narrow bandwidth would allow long nonlinear crystals to be used to satisfy the phase matching condition. This ability of using long crystals is advantageous because the conversion efficiency increases with the lengths of the nonlinear crystals. In FIG. 3, the power amplifier can be a fiber amplifier with LMA for achieving high output power, or a solid state amplifier based on Nd:YAG, YLF, Nd glass materials that are optically pumped by diode lasers or flash lamps. The nonlinear crystal can be LBO, KTP crystals used for second harmonics generation, or LBO crystals, BBO crystals for third harmonic generation or higher order harmonic generation.

Referring back to FIG. 1, a nonlinear Schrödinger equation for the operation of the device without Raman effects can be expressed as follows:

$$\frac{\partial \psi_s}{\partial z} + \frac{i}{2}\beta_{2s}\frac{\partial^2 \psi_s}{\partial T^2} - \frac{\beta_{3s}}{6}\frac{\partial^3 \psi_s}{\partial T^3} = i\gamma_s[|\psi_s|^2]\psi_s + \frac{\alpha_s}{2}\psi_s.$$

To obtain a reversal equation for obtaining required input from desired output, the z can be replaced with −z in the above equation:

$$\frac{\partial \psi_s}{\partial z} + \frac{i}{2}(-\beta_{2s})\frac{\partial^2 \psi_s}{\partial T^2} - \frac{(-\beta_{3s})}{6}\frac{\partial^3 \psi_s}{\partial T^3} = i(-\gamma_s)[|\psi_s|^2]\psi_s + \frac{(-\alpha_s)}{2}\psi_s.$$

This suggests that a reversal operation can be achieved by changing the sign for optical dispersion, SPM and gain/loss. As such, the positive chirp in the laser pulses can be used in combination with SPM in the normal optical dispersion to reverse the spreading of the spectral width caused by optical dispersion and to achieve narrowed spectral bandwidth.

Various simulations have been conducted to illustrate this effect. The simulations were performed by using a commercial software tool from FiberDesk (http://www.fiberdesk.com/) that can handle linear and nonlinear pulse propagation based on solving the extended nonlinear Schrödinger (NLS) equation by the split-step Fourier transform method and including effects of self phase modulation, chromatic dispersions, Raman effect, and optical gain with uniformed gain coefficients.

Figure 4A:
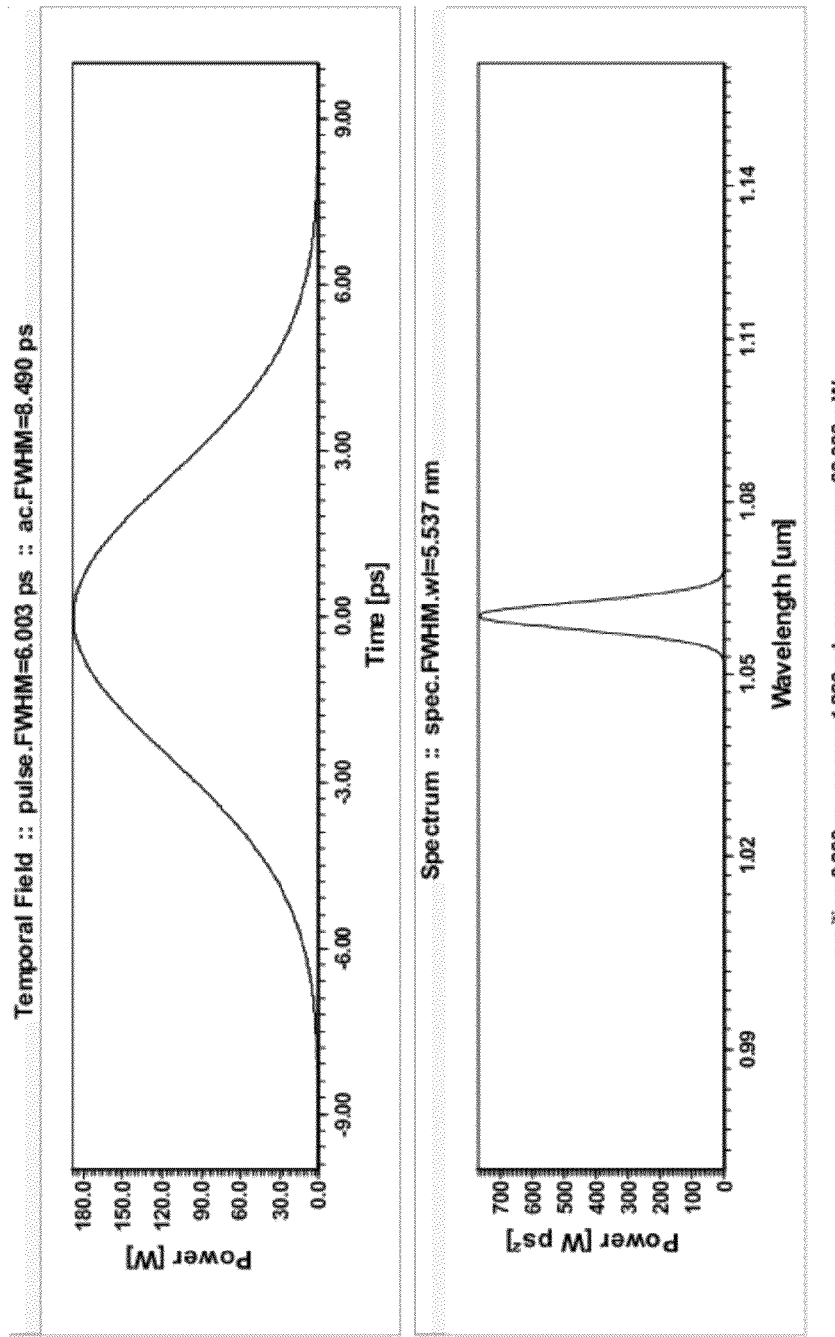
Figure 4B:
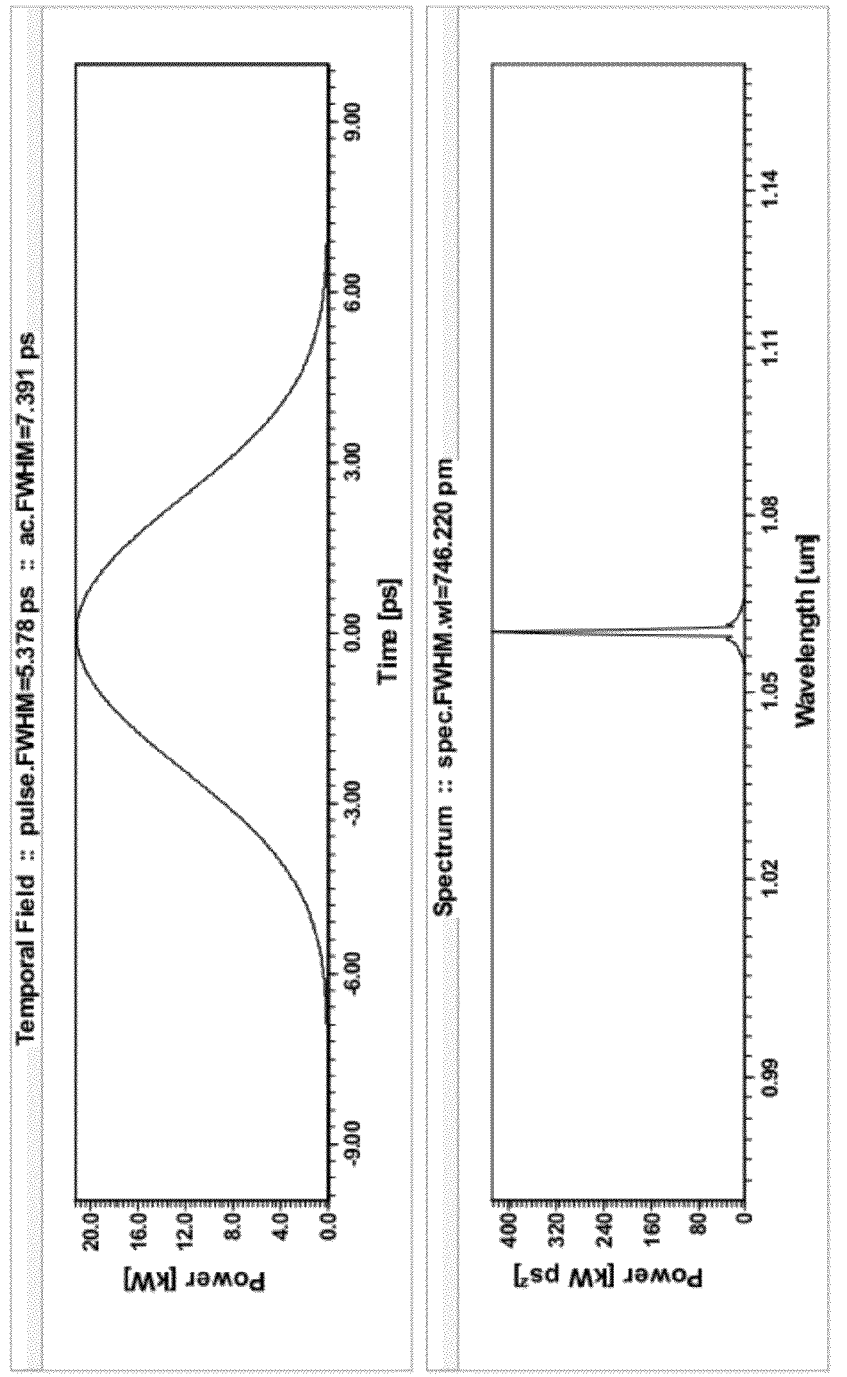

FIG. 4A shows temporal and spectral profiles of a pre-chirped laser pulse prior to entering the fiber optical amplifier. The chirp in linear and −65000 fs. FIG. 4B shows the temporal and spectral profiles of the output pulse of the fiber optical amplifier with reduced spectral bandwidth and substantially unchanged pulse duration, where the mode field diameter (MFD) is 20 um, the gain is 20 dB and the dispersion is −41.9 ps/nm/km.

Figure 5A:
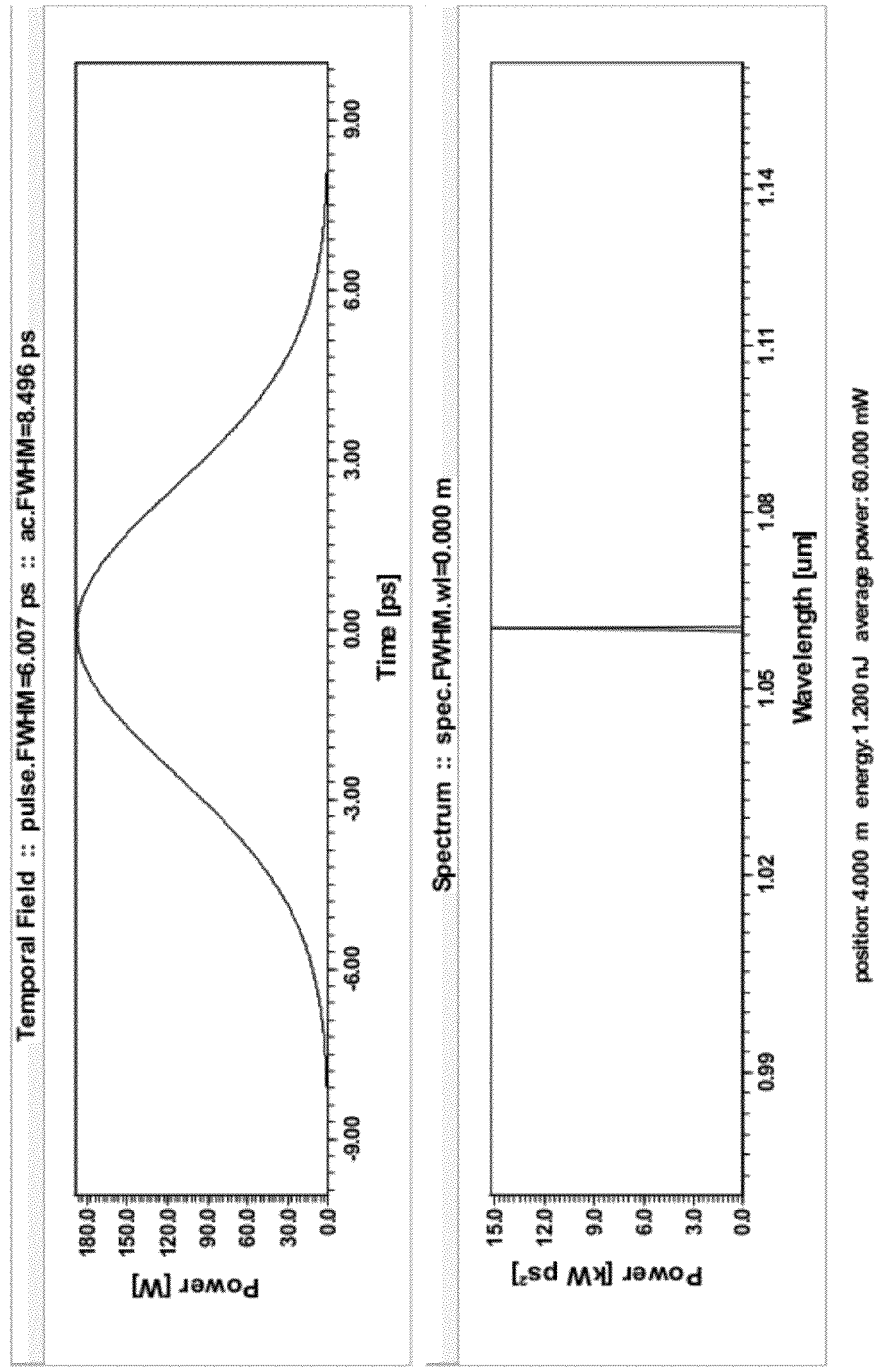
Figure 6A:
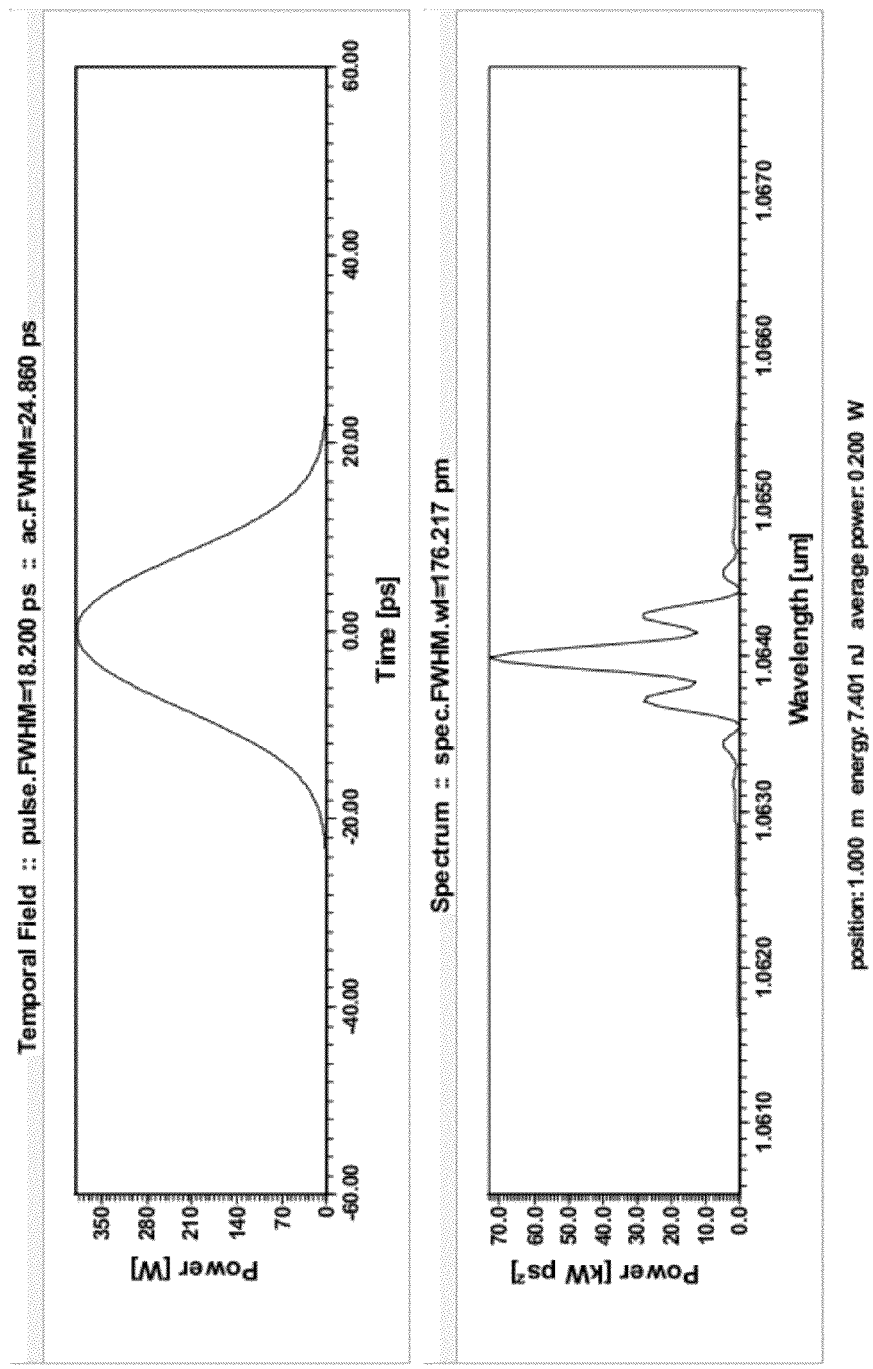
Figure 6B:
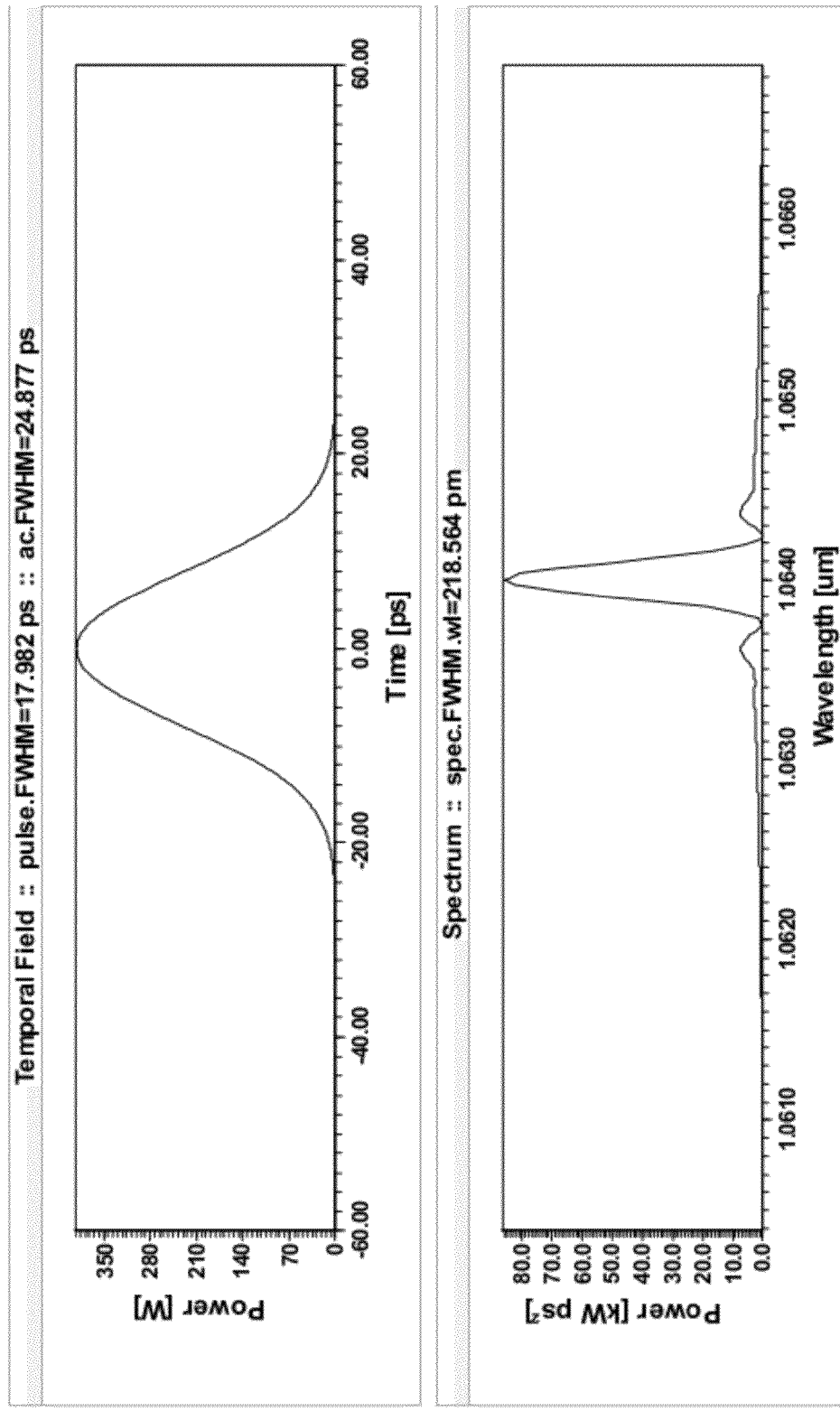
Figure 6C:
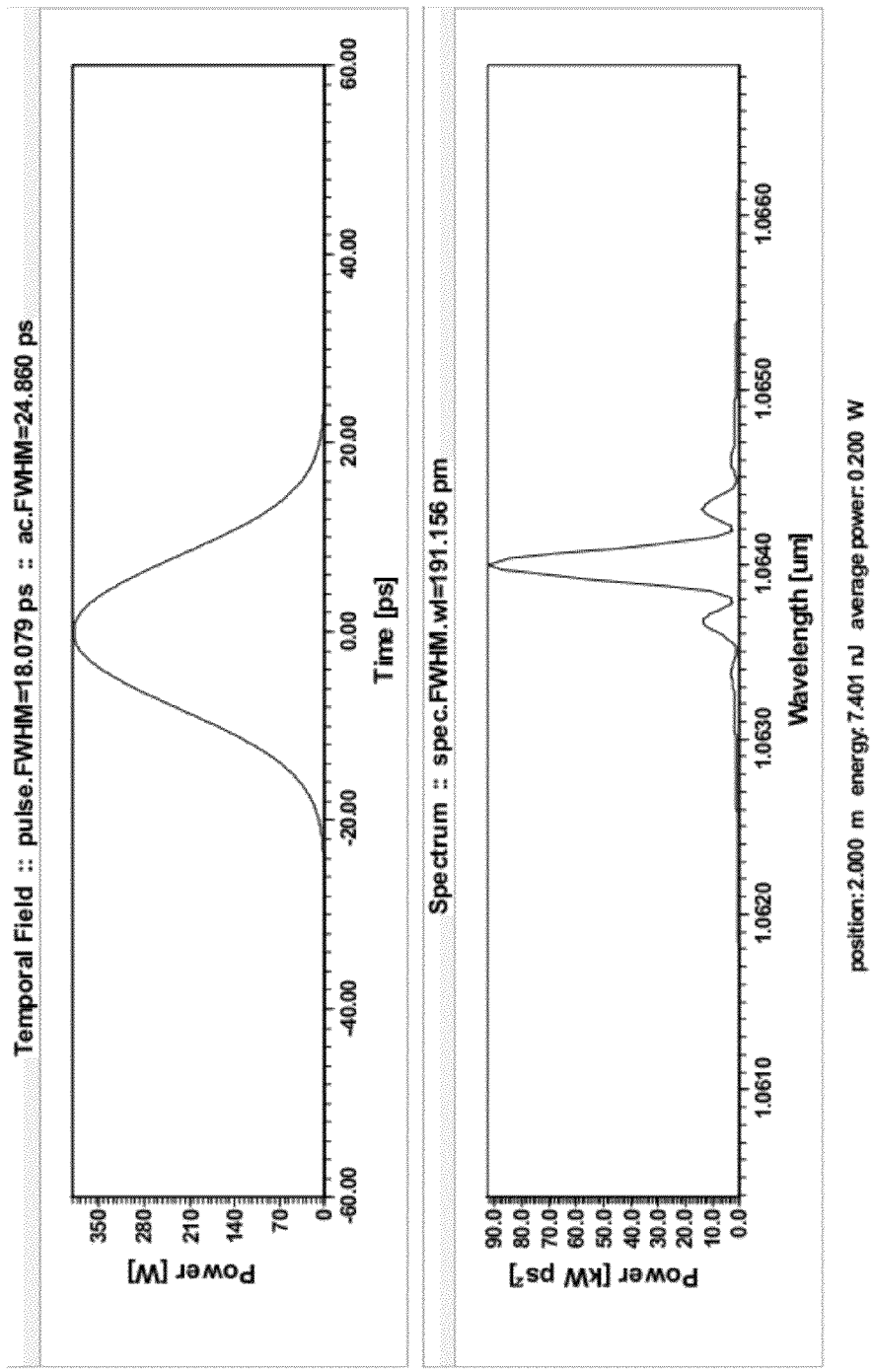
Figure 6D:
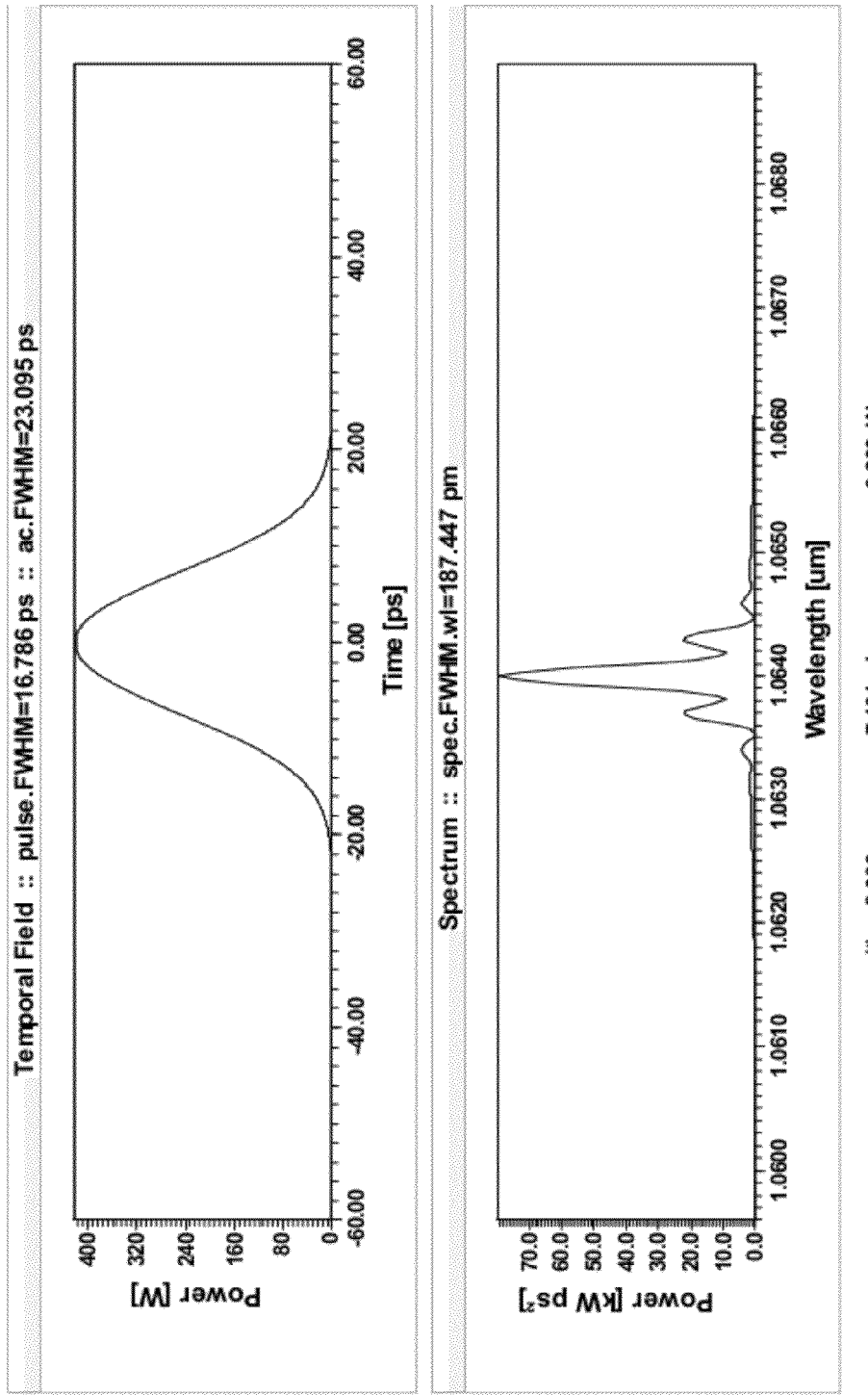

In comparison, FIGS. 5A and 5B show the simulation without the positive chirp in the input pulses to the amplifier where the spectrum of the output pulse from the fiber amplifier is widened with undesired spectral features.

TABLE 1

|     | Fs Seed laser | Prechirp stretcher (CFBG blue end first) | Power Amplifier (Yb500, MFD = 6 um) | Spectral compression fiber (Corning PM980) | |
|-----|---------------|------------------------------------------|-------------------------------------|--------------------------------------------|---|
| (A) | 2.78 nm/ 0.60 ps/ 0.5 mW | 2.7 nm/ 19 ps/ 0.1 mW | 4 m 200 mW | +9 m 0.176 nm/ 18.2 ps/ 200 mW | |
| (B) | 2.78 nm/ 0.60 ps/ 0.5 mW | 2.7 nm/ 19 ps/ 0.1 mW | 4 m 200 mW | +7 m 0.22 nm/ 18.0 ps/ 200 mW | |
| (C) | 2.78 nm/ 0.60 ps/ 0.5 mW | 2.7 nm/ 19 ps/ 0.1 mW | 4 m 200 mW | +8 m 0.19 nm/ 18.1 ps/ 200 mW | |
| (D) | 2.57 nm/ 0.65 ps/ 0.5 mW | 2.3 nm/ 17 ps/ 0.1 mW | 4 m 200 mW | +7 m 0.21 nm/ 16.7 ps/ 200 mW | +1 m 0.187 nm 16.8 ps 200 mW |

Figure 7A:
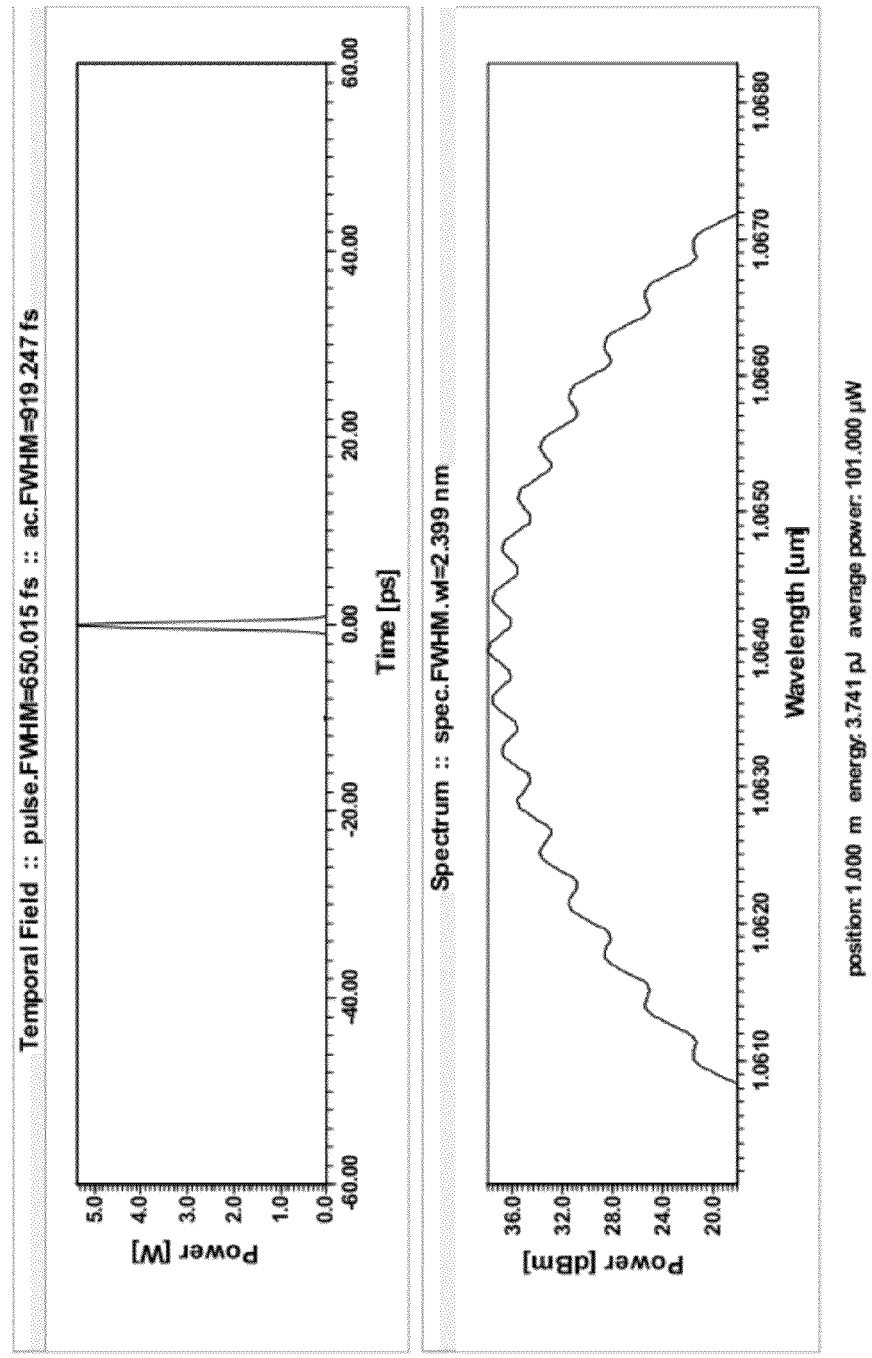
Figure 7B:
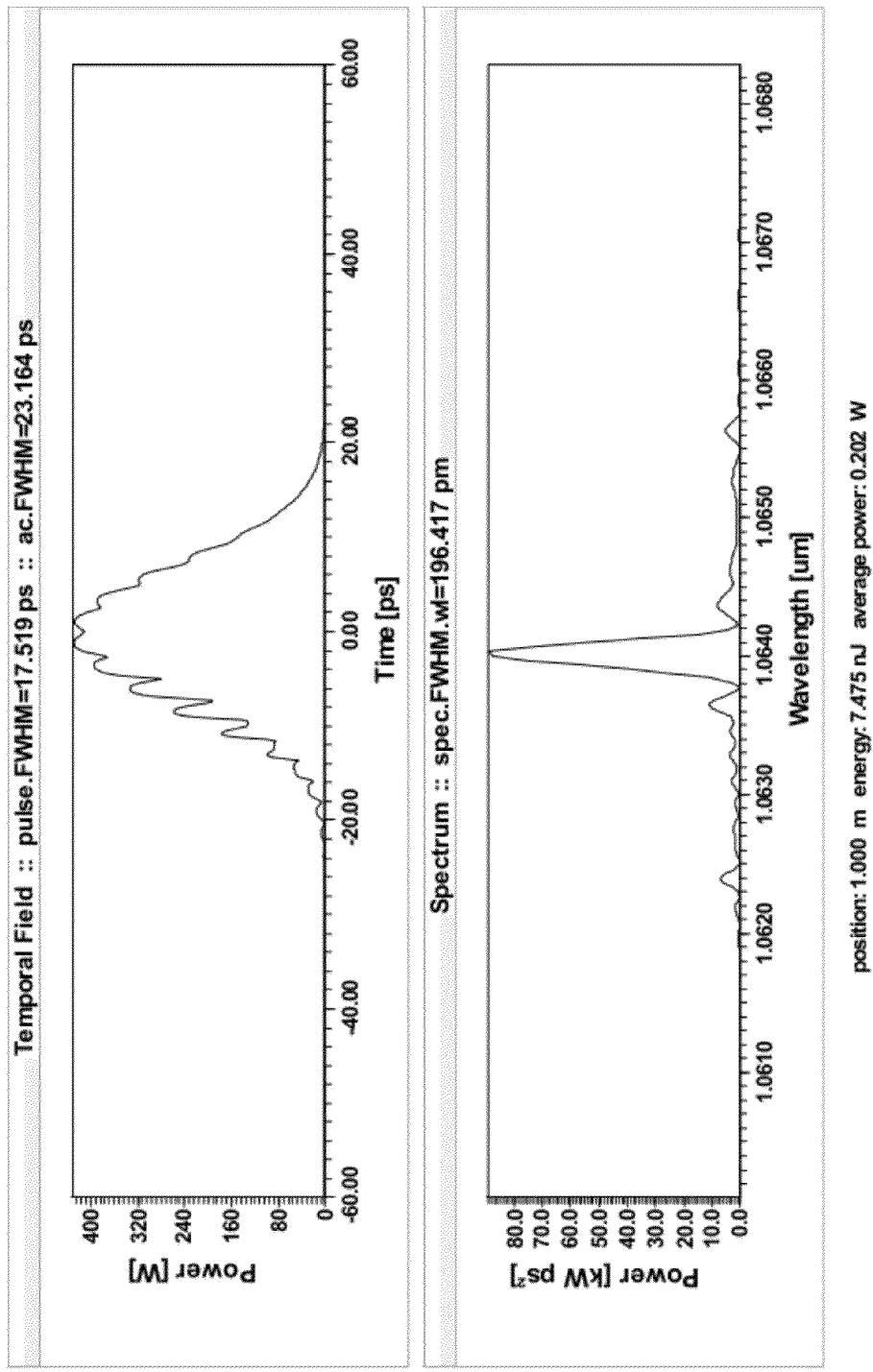
Figure 7C:
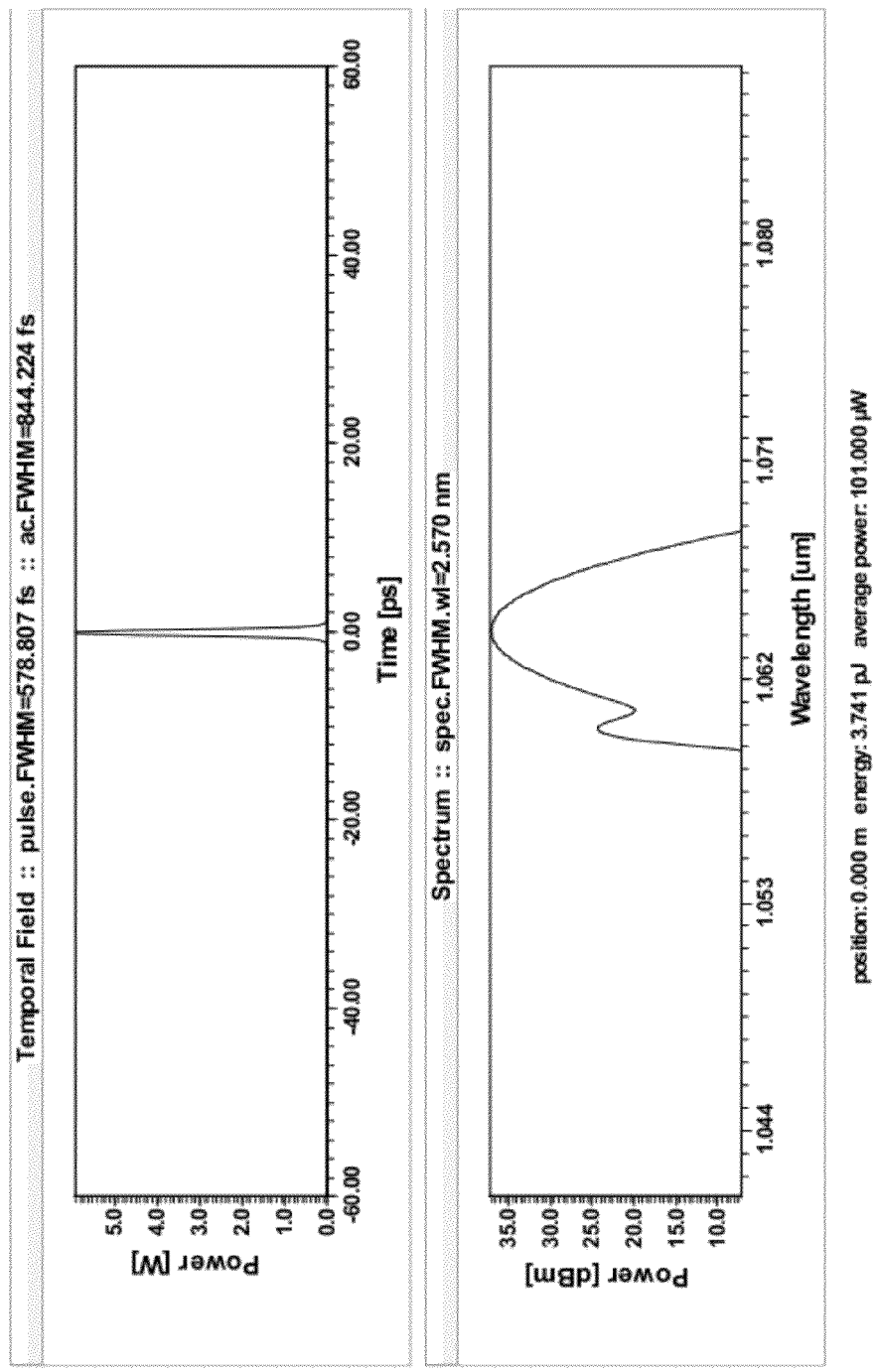

Table 1 shows 4 configurations (A), (B), (C) and (D) of the device in FIG. 2 with the spectral compression fiber and FIGS. 6A, 6B, 6C, 6D, 7A, 7B and 7C show the simulated performance of the 4 configurations of the device in FIG. 2. The pulse width is transform from sub-picosecond to tens picoseconds (a 10-fold increase) while the bandwidth is transformed from several nm to about 0.2 nm (a 10-fold reduction). In addition, as shown in FIGS. 7A, 7B and 7C, this design is robust against small imperfection in input pulse. Simulations in FIGS. 7A and 7B show that small spectral ripples in the input laser pulses do not cause significant change in the output. FIG. 7C shows that small side peak of input pulse does not significantly alter the output characteristics.

Figure 8A:
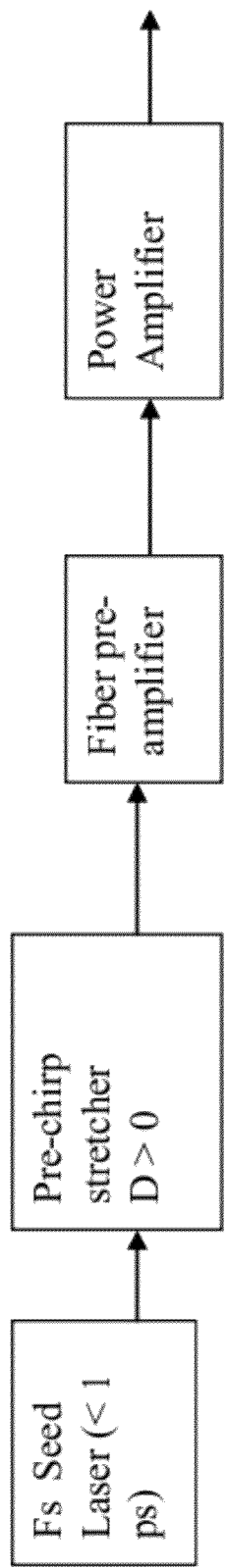
Figure 8B:
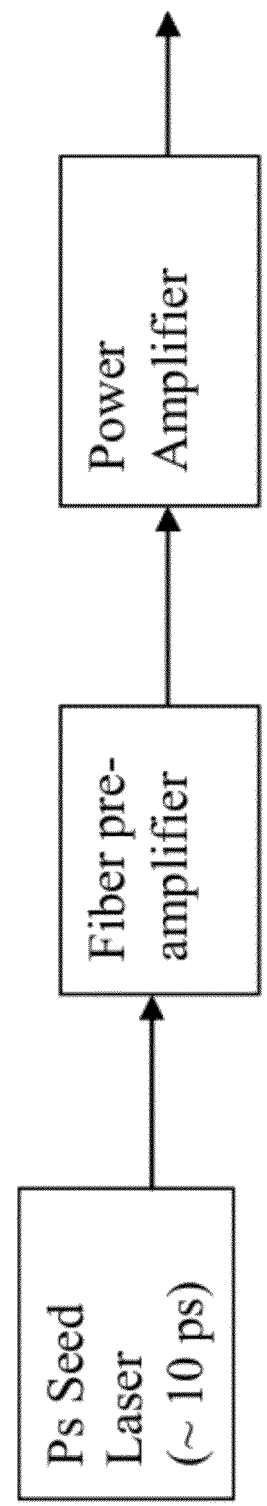
Figure 9:
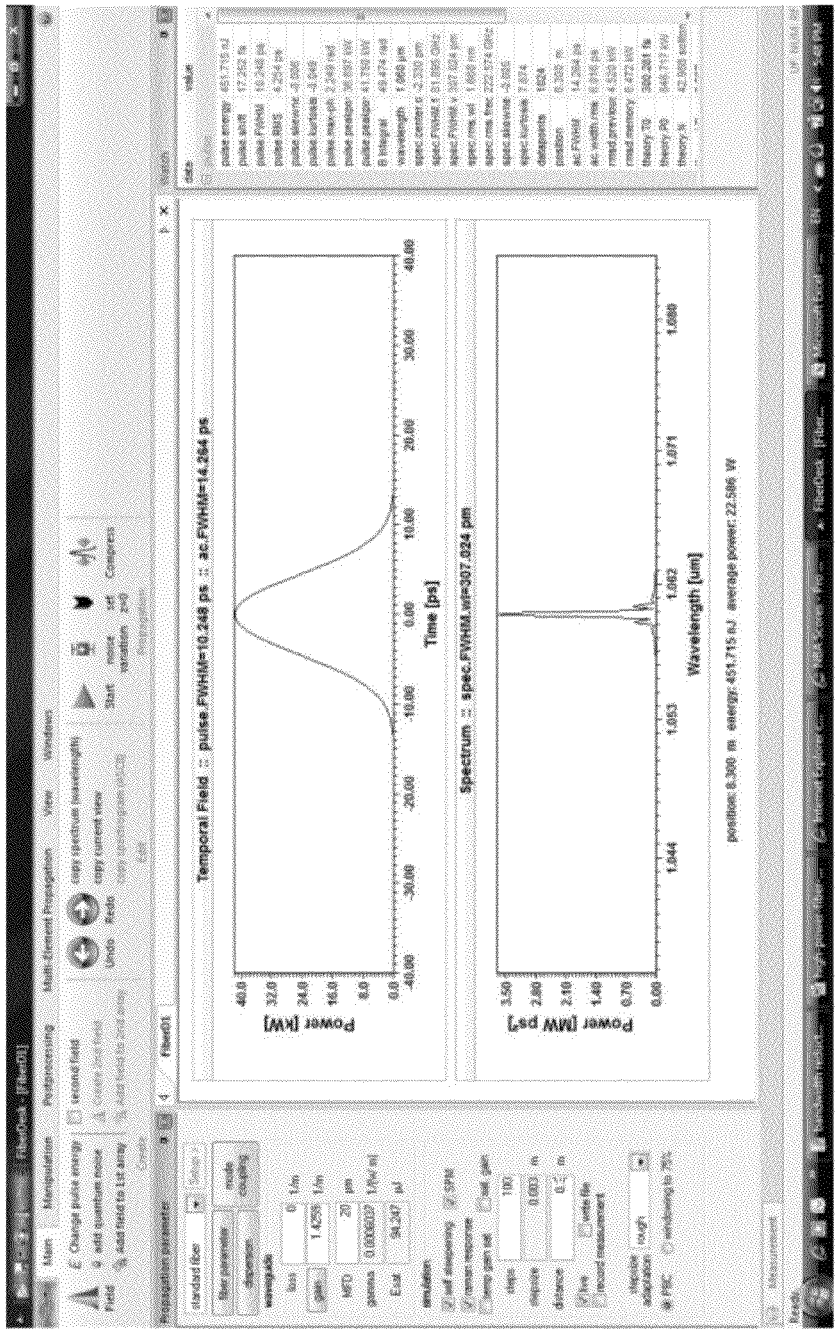
Figure 10:
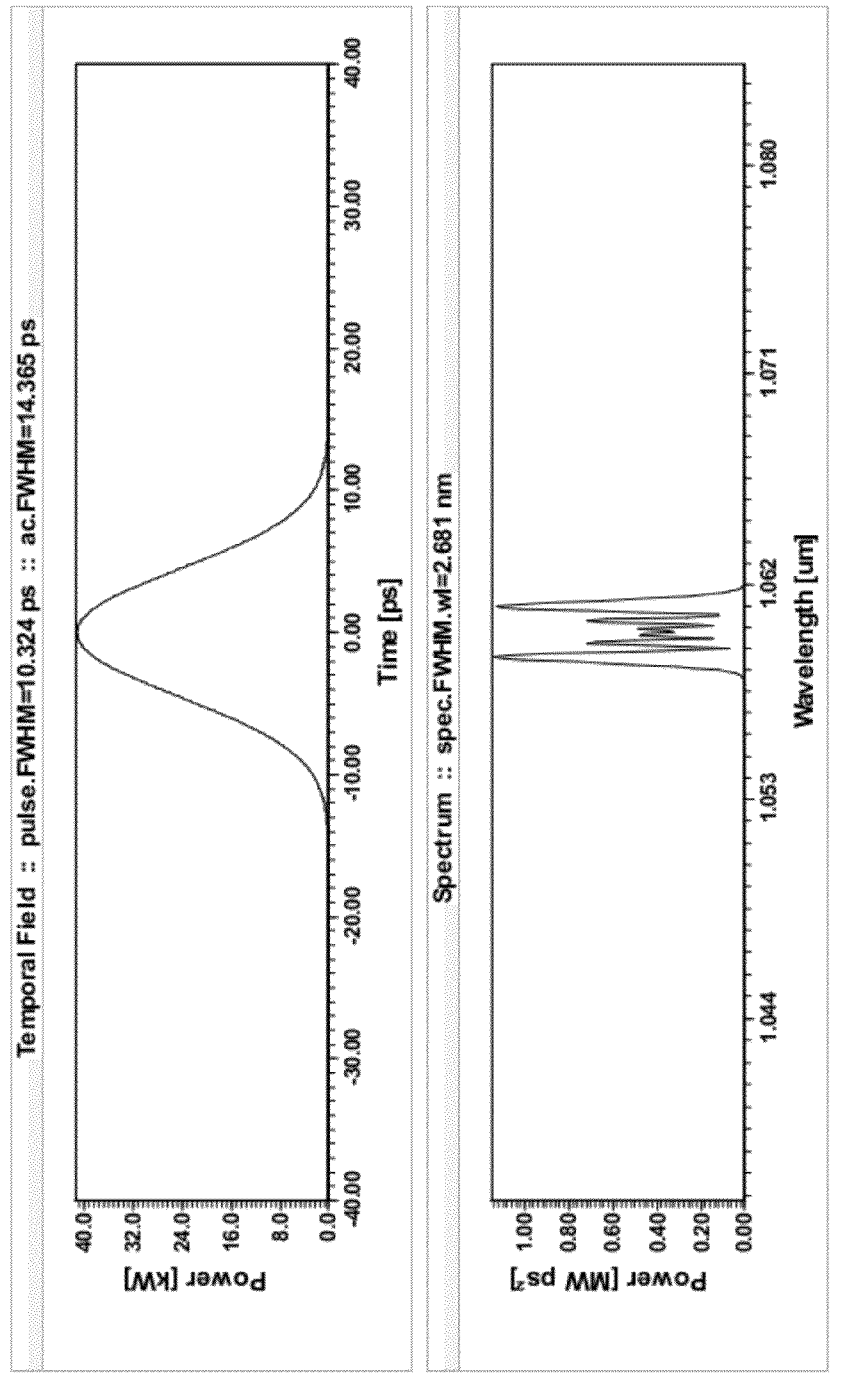
Figure 11:
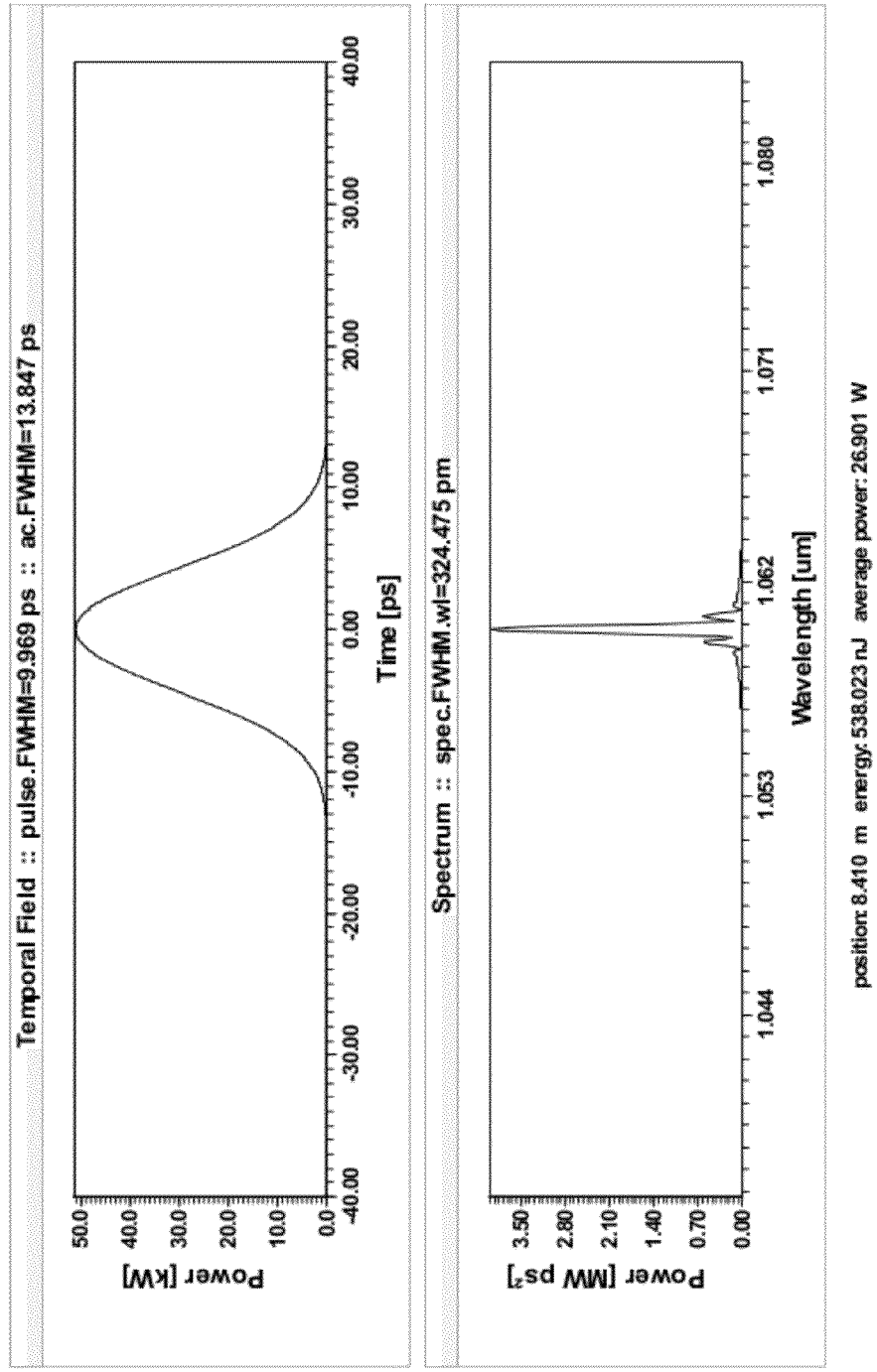
Figure 12:
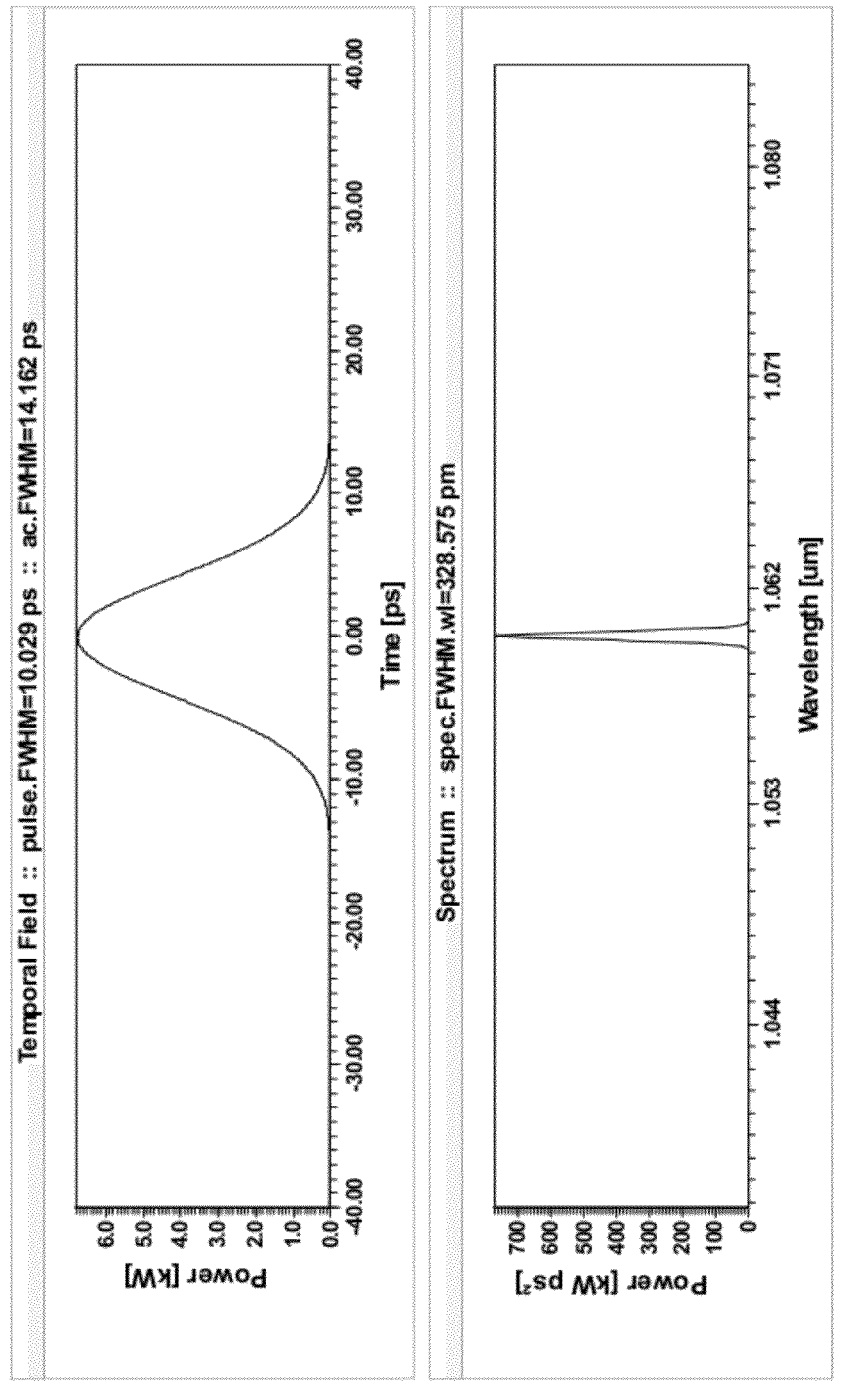

FIGS. 8A and 8B show two devices where FIG. 8A is based on the design in FIG. 1 and FIG. 8B is a design that uses two cascaded fiber amplifiers without using the present technique in FIG. 1. Table 2 shows simulation results of the two designs using the same high power fiber power amplifier. FIGS. 9, 10, 11 and 12 show the temporal and spectral profiles of the simulations and demonstrate that the device in FIG. 8A is superior to the device in FIG. 8B.

TABLE 2

| | Configuration | Seed laser | Prechirp stretcher | Fiber pre-amplifier | Power Amplifier | Output | |
|---|---|---|---|---|---|---|---|
| (i) | FIG. 8A | Pulsewidth = 0.5 ps Spectral width = 3.3 nm Power = 1 mW at 1064 nm | Dispersion = −2 ps^2 Loss = 6 dB Output = 0.25 mW 11 ps | Output = 50 mW Gain = 23 dB MFD = 6 um Length = 2 m | Output = 22.5 W Gain = 26.5 dB MFD = 20 um Length = 4.3 M | Power = 22.5 W Spectral width = 0.307 nm | |
| (ii) | FIG. 8B | Pulsewidth = 10 ps Spectral wdith = 0.16 nm Power = 1 mW at 1064 nm | N/A | Output = 50 mW Gain = 20 dB Core = 6 um Length = 2 m | Output = 22.5 W Gain = 26.5 dB MFD = 20 um Length = 4.3 M | Power = 22.5 W Spectral width = 2.68 nm | To reach bandwidth <0.32 nm, P < 3.6 W |
| (iii) | FIG. 8A | Pulsewidth = 0.4 ps Spectral wdith = 4.1 nm Power = 1 mW at 1064 nm | Dispersion = −1.6 ps^2 Loss = 6 dB Output = 0.25 mW 11 ps | Output = 50 mW Gain = 23 dB MFD = 6 um Length = 2 m | Output = 26.9 W Gain = 27.3 dB MFD = 20 um Length = 4.41 M | Power = 26.9 W Spectral width = 0.324 nm | |

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for generating laser pulses by using nonlinear optical self-phase modulation to compress a spectral width of each laser pulse, comprising:
   generating seed laser pulses having a seed pulse duration;
   modifying the seed laser pulses to produce modified laser pulses that have a pulse duration greater than the seed pulse duration and have a positive chirp in optical frequency; and
   directing the modified laser pulses into a nonlinear optical amplifier formed of an optical gain medium exhibiting normal optical dispersion to the modified laser pulses to amplify the modified optical pulses with the positive chirp to a power level that causes nonlinear optical self-phase modulation in the optical amplifier to compress a spectral width of the amplified modified optical pulses to be less than a spectral width of the seed laser pulses while having a pulse duration longer than the seed pulse duration.

2. The method as in claim 1, comprising:
   directing the amplified optical pulses output by the optical amplifier into an optical medium that exhibits normal optical dispersion to further compress a spectral width of the amplified optical pulses based on self-phase modulation in the optical medium.

3. The method as in claim 2, wherein the optical medium is a polarization maintaining optical fiber.

4. The method as in claim 1, comprising:
   using an optical device exhibiting anomalous optical dispersion in modifying the seed laser pulses to produce the modified laser pulses that have the pulse duration greater than the seed pulse duration and have the positive chirp in optical frequency.

5. The method as in claim 4, wherein the optical device exhibiting anomalous optical dispersion in modifying the seed laser pulses includes a polarization maintaining fiber.

6. The method as in claim 1, comprising:
directing the amplified optical pulses output by the optical amplifier into a second optical amplifier to further amplify power of the amplified optical pulses.

7. The method as in claim 6, comprising:
configuring the second optical amplifier to include a double clad large mode-area fiber amplifier to generate high output power in the amplified optical pulses.

8. The method as in claim 6, wherein:
the second optical amplifier is formed of an optical gain medium exhibiting normal optical dispersion to the amplified laser pulses and exhibits self-phase modulation to further compress a spectral width of the amplified optical pulses.

9. The method as in claim 8, comprising:
directing laser pulses output by the second optical amplifier into a nonlinear optical material to generate an efficient nonlinear optical effect based on compressed spectral width and amplified power of the laser pulses output by the second optical amplifier.

10. The method as in claim 9, wherein the nonlinear optical effect is generation of an optical harmonic signal.

11. A device for generating laser pulses based on compression of a spectral width of a laser pulse via nonlinear optical self-phase modulation, comprising:
a seed pulsed laser to generate seed laser pulses having a seed pulse duration;
an optical stretcher that receives the seed laser pulses and configured to modify the seed laser pulses to produce modified laser pulses that have a pulse duration greater than the seed pulse duration and have a positive chirp in optical frequency; and
a nonlinear optical amplifier formed of an optical gain medium exhibiting normal optical dispersion to the modified laser pulses, the nonlinear optical amplifier coupled to receive the modified laser pulses from the optical stretcher and configured to amplify the modified optical pulses with the positive chirp to a power level that causes nonlinear optical self-phase modulation in the nonlinear optical amplifier to compress a spectral width of the amplified modified optical pulses to be less than a spectral width of the seed laser pulses while having a pulse duration longer than the seed pulse duration.

12. The device as in claim 11, wherein the seed pulsed laser is a mode-locked fiber laser.

13. The device as in claim 11, wherein the seed pulsed laser is a pulsed laser and the seed pulse spectral width supports a pulse duration around or less than 1 pico second and the amplified modified optical pulses output by the optical amplifier have a pulse duration around or greater than 3 pico seconds.

14. The device as in claim 11, wherein the optical stretcher includes:
an input fiber that receives the amplified modified optical pulses output by the optical amplifier,
a chirped fiber Bragg grating coupled to receive light from the input fiber, and
an output fiber coupled to receive reflected light from the chirped fiber Bragg grating and to direct the received light to the optical amplifier,
wherein the chirped fiber Bragg grating is oriented to cause a positive chirp in frequency to the reflected light that is received by the output fiber.

15. The device as in claim 14, wherein the optical stretcher includes an optical circulator that couples light from the input fiber to the chirped fiber Bragg grating and couples reflected light from the chirped fiber Bragg grating into the output fiber.

16. The device as in claim 14, wherein the optical stretcher includes an optical coupler that couples light from the input fiber to the chirped fiber Bragg grating and couples reflected light from the chirped fiber Bragg grating into the output fiber.

17. The device as in claim 14, wherein the optical stretcher includes a grating pair with two gratings.

18. The device as in claim 14, wherein the optical stretcher is a polarization maintaining device.

19. The device as in claim 14, comprising:
a second optical amplifier coupled to receive the amplified optical pulses output by the optical amplifier and to further amplify power of the amplified optical pulses, wherein the second optical amplifier is formed of an optical gain medium exhibiting normal optical dispersion to the amplified laser pulses and exhibits self-phase modulation to further compress a spectral width of the amplified optical pulses.

20. The device as in claim 14, comprising:
an optical medium that exhibits normal optical dispersion and is coupled to receive the amplified optical pulses output by the optical amplifier to further compress a spectral width of the amplified optical pulses based on self-phase modulation in the optical medium.

21. The device as in claim 14, comprising:
a second optical amplifier coupled to receive the amplified optical pulses output by the optical amplifier and to further amplify power of the amplified optical pulses; and
a nonlinear optical material positioned to receive the amplified optical pulses from the second optical amplifier, the nonlinear optical material operable to generate an efficient nonlinear optical effect based on compressed spectral width and amplified power of the received laser pulses.

22. A device for generating laser pulses based on compression of a spectral width of a laser pulse via nonlinear optical self-phase modulation, comprising:
a seed pulsed fiber laser to generate seed laser pulses having a seed pulse duration;
an optical fiber stretcher coupled to the seed pulsed fiber laser to receive the seed laser pulses and configured to include a chirped fiber Bragg grating exhibiting anomalous optical dispersion, the optical fiber stretcher operable to modify the seed laser pulses to produce modified laser pulses that have a pulse duration greater than the seed pulse duration and have a positive chirp in optical frequency; and
an optical fiber amplifier exhibiting normal optical dispersion to the modified laser pulses and coupled to receive the modified laser pulses from the optical fiber stretcher, the optical fiber amplifier configured to amplify the modified optical pulses with the positive chirp to a power level that causes nonlinear optical self-phase modulation in the optical fiber amplifier to compress a spectral width of the amplified modified optical pulses to be less than a spectral width of the seed laser pulses while having a pulse duration longer than the seed pulse duration.

23. The device as in claim 22, wherein the optical fiber amplifier includes a double clad large mode-area fiber amplifier to generate high output power in amplifying the modified optical pulses.

* * * * *